US009816396B2

United States Patent
Mickelsen et al.

(10) Patent No.: US 9,816,396 B2
(45) Date of Patent: Nov. 14, 2017

(54) INTEGRATED OUTER FLOWPATH DUCTING AND FRONT FRAME SYSTEM FOR USE IN A TURBOFAN ENGINE AND METHOD FOR MAKING SAME

(71) Applicant: HONEYWELL INTERNATIONAL INC., Morristown, NJ (US)

(72) Inventors: Justin C. Mickelsen, Phoenix, AZ (US); Laurence David Noble Liston, Gilbert, AZ (US); Mark Knowles, Mesa, AZ (US); Shawn Alstad, Peoria, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 440 days.

(21) Appl. No.: 14/516,270

(22) Filed: Oct. 16, 2014

(65) Prior Publication Data

US 2016/0108757 A1 Apr. 21, 2016

(51) Int. Cl.
*F01D 25/24* (2006.01)
*F01D 25/16* (2006.01)
*F01D 25/28* (2006.01)
*F02K 3/06* (2006.01)
*F01D 25/00* (2006.01)

(52) U.S. Cl.
CPC ........... *F01D 25/24* (2013.01); *F01D 25/005* (2013.01); *F01D 25/162* (2013.01); *F01D 25/28* (2013.01); *F02K 3/06* (2013.01); *Y02T 50/672* (2013.01)

(58) Field of Classification Search
CPC .......... F01D 25/00; F01D 25/24; F01D 25/26; F01D 25/28; F01D 25/005; F01D 25/162; F02D 3/06
See application file for complete search history.

(56) References Cited

U.S. PATENT DOCUMENTS

| 5,160,251 | A | 11/1992 | Ciokajlo |
| 7,434,303 | B2 | 10/2008 | Maguire |
| 8,469,309 | B2 | 6/2013 | Stuart et al. |
| 2007/0068136 | A1 | 3/2007 | Cameriano et al. |
| 2010/0068051 | A1 | 3/2010 | Cloft et al. |
| 2011/0252808 | A1 | 10/2011 | McKenney et al. |
| 2013/0108432 | A1* | 5/2013 | Desjoyeaux ............ F01D 5/282 415/208.1 |
| 2013/0280052 | A1 | 10/2013 | Gonidec et al. |

FOREIGN PATENT DOCUMENTS

| EP | 1845018 B1 | 11/2013 |
| FR | 2940359 A1 | 6/2010 |
| GB | 2242711 A | 10/1991 |

OTHER PUBLICATIONS

Extended EP search report for Application No. 15189191.8-1610 dated Feb. 29, 2016.

* cited by examiner

*Primary Examiner* — Richard Edgar
(74) *Attorney, Agent, or Firm* — Lorenz & Kopf, LLP

(57) ABSTRACT

A system and method is provided for an integrated aircraft turbofan engine outer flowpath ducting and front frame that minimizes assembly interfaces and reduces overall aircraft engine weight. The system and method provide an integrated turbofan engine outer flowpath ducting and front frame system that decouples the fairing/aerodynamic duties from the struts/weight bearing duties thereby enabling efficient distribution of mechanical load.

18 Claims, 5 Drawing Sheets

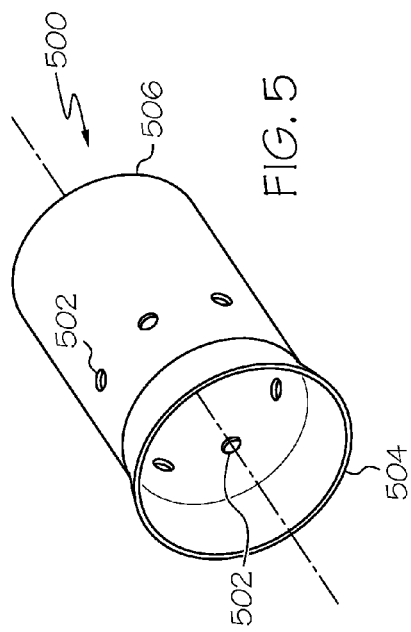
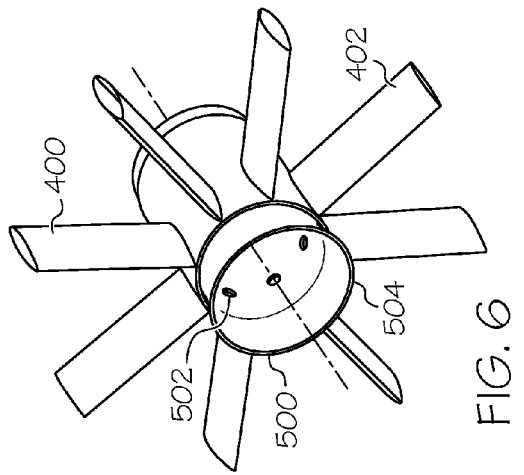
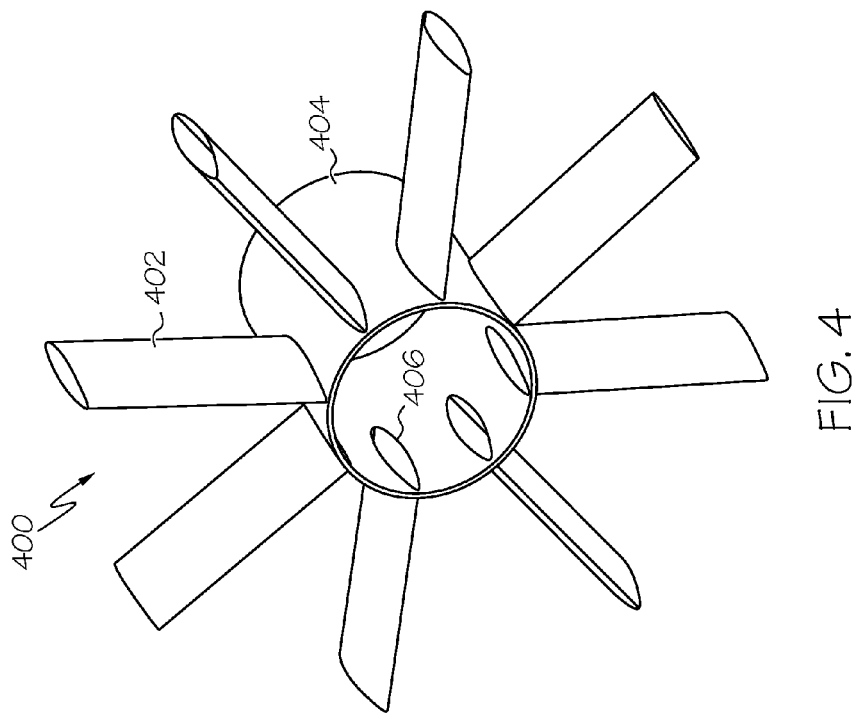

INTEGRATED OUTER FLOWPATH DUCTING AND FRONT FRAME SYSTEM FOR USE IN A TURBOFAN ENGINE AND METHOD FOR MAKING SAME

TECHNICAL FIELD

The present invention generally relates to turbofan engines, and more particularly relates to the outer flowpath ducting and front frame system of a turbofan engine and method for making same.

BACKGROUND

Aircraft engine competitiveness is influenced by numerous engine attributes. One of the most salient engine attributes is the maximum thrust-to-weight ratio that is offered by an aircraft turbofan engine while remaining safely mounted to the aircraft and providing safe operation. The thrust-to-weight ratio can be improved by reducing the overall weight without affecting the engine thrust. Thus, aircraft turbofan engine competitiveness may be improved by reducing overall aircraft engine weight, which is impacted by factors such as the number of assembly interfaces in the engine, the number of components/parts that go into the engine, and the way in which loads are distributed throughout the engine.

An aerodynamically streamlined aircraft turbofan engine is typically comprised of multiple components coupled via multiple stages of assembly interfaces to form an inlet inner barrel, engine fan housing, front frame, and bypass structure, that surrounds the bulk of the aircraft engine core. Reducing part count and/or using lightweight materials in any of the aircraft turbofan engine stages may result in a reduction of the overall weight of the aircraft turbofan engine.

Among the aforementioned stages, the aircraft engine front frame is typically a relatively high weight and expensive-to-manufacture component that must satisfy multiple criteria. The aircraft engine front frame is required to support/transfer the mechanical loads between the engine core and the airframe, and is also the primary structure that supports the engine core and the gearbox. Further, the aircraft engine front frame is the mechanism configured to aerodynamically force the airflow into either the core of the engine or allow the airflow to bypass the core and enter into the bypass flowpath formed by outer flowpath ducting. Therefore, reducing the weight of the aircraft engine front frame and outer flowpath ducting would significantly impact overall aircraft engine weight and improve aircraft engine competitiveness.

Accordingly, it would be desirable to provide an integrated outer flowpath ducting and front frame system and method for an aircraft turbofan engine that minimizes assembly interfaces and reduces overall aircraft engine weight. It would be further desirable to provide an integrated outer flowpath ducting and front frame system and method for a turbofan engine that minimizes assembly interfaces and enables efficient distribution of mechanical load.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In view of the foregoing, an outer flowpath ducting and front frame system in a turbofan engine is provided. The engine outer flowpath ducting and front frame system comprises a load housing that comprises a primary composite load path circumferentially surrounding an engine centerline and defining the outer flowpath, and a front frame assembly centered within the load housing and configured to i) direct air through the outer flowpath, and ii) bear weight. The front frame assembly is detachably coupled to the load housing.

Another outer flowpath ducting and front frame system in a turbofan engine is provided. The engine outer flowpath ducting and front frame system comprises a primary composite load path circumferentially surrounding an engine centerline and defining the outer flowpath and a front frame assembly centered within the primary composite load path. The front frame assembly comprises a metallic hub, a first number of aerodynamically configured fairings coupled to the metallic hub and extending radially to the primary composite load path, and the first number of load-bearing metal struts, each load-bearing strut coupled on a first end to the metallic hub and coupled on the second end to the primary composite load path.

Also provided is a method for reducing turbofan engine weight in a turbofan engine having outer flowpath ducting. The method comprises defining the outer flowpath circumferentially around the engine centerline with a continuous primary composite load path and directing airflow through the outer flowpath with a plurality of aerodynamically determined composite fairings. The method also comprises positioning a plurality of load-bearing metal struts between the primary composite load path and a centered hub and coupling the load-bearing metal struts to the primary composite load path.

Other desirable features and advantages will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

FIG. 4 is a three dimensional view of a composite fairing structure, in accordance with an exemplary embodiment;

FIG. 5 is a three dimensional view of a metallic hub, configured to be coupled to the exemplary fairing structure of FIG. 4, in accordance with an exemplary embodiment;

FIG. 6 is a three dimensional view showing the composite fairing structure of FIG. 4 coupled to the metallic hub of FIG. 5, in accordance with an exemplary embodiment;

DETAILED DESCRIPTION

Figure 1:
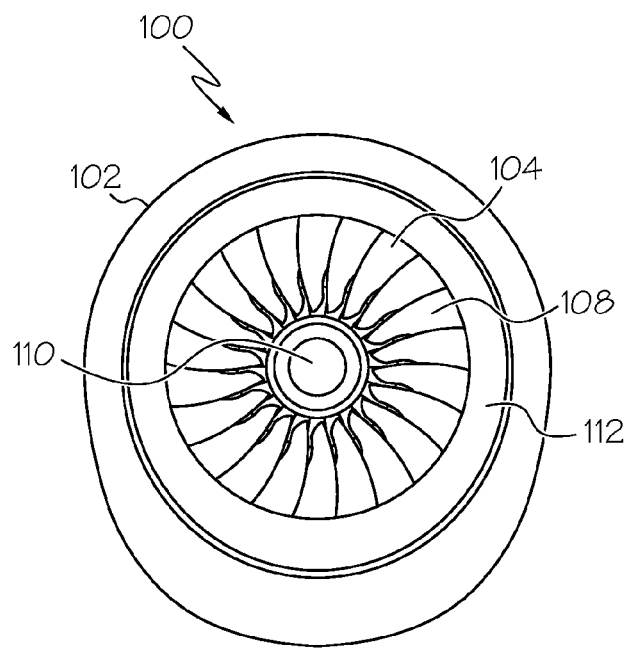
FIG. 1 is a front view of a traditional aircraft turbofan engine.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, functional aspects of various turbofan engine systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following descriptions may refer to elements or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Various embodiments are directed to an integrated aircraft turbofan engine outer flowpath ducting and front frame system, and methods for producing the same. The embodiments described herein are merely an example and serve as a guide for implementing the novel systems and method herein on any industrial, commercial, or consumer turbofan application. As such, the examples presented herein are intended as non-limiting.

Figure 2:
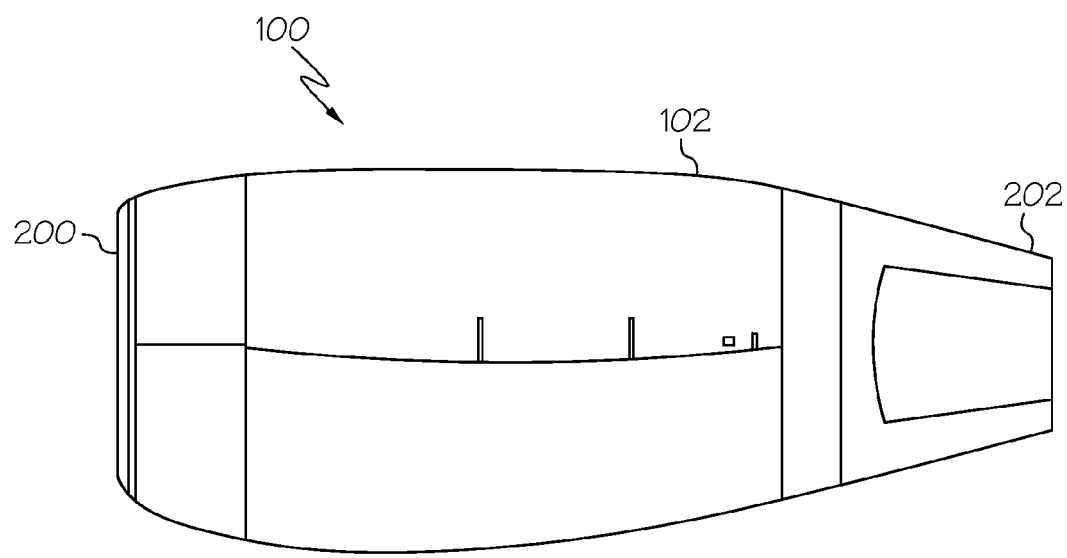
FIG. 2 is side view of the traditional aircraft turbofan engine shown in FIG. 1.

FIGS. 1 and 2 are front and side views, respectively, of a traditional aircraft turbofan engine 100. The turbofan engine 100 is a component of an aircraft's propulsion system. It includes an aerodynamically smooth outer covering referred to as the nacelle cowling 102 that wraps around and substantially encases the turbofan engine, wider at the front or inlet end 200 of the turbofan engine and narrower at the back or exhaust end 202 of the turbofan engine. The engine fan assembly 104 includes a plurality of fan blades 108 that are independently or integrally attached to, and extend radially out from, a fan rotor hub 110 centered within inlet cavity 112.

Figure 3:
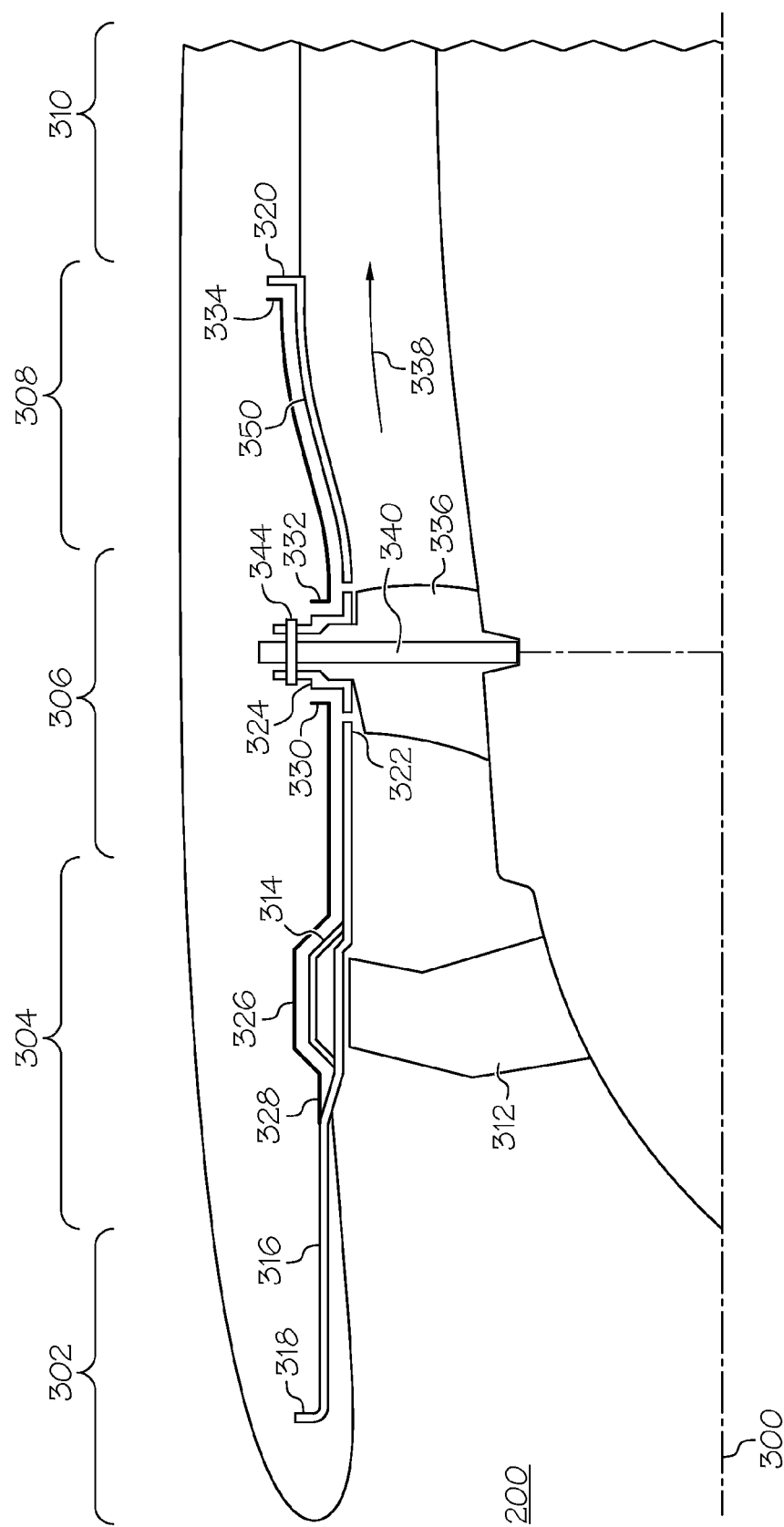
FIG. 3 is a longitudinal cross-sectional view of a front portion of a turbofan engine in accordance with an exemplary embodiment.

FIG. 3 is a longitudinal cross-sectional view of a front portion of a turbofan engine in accordance with an exemplary embodiment. Only the upper half of the engine, delineated by engine centerline 300, is shown for clarity. As can be seen, the nacelle cowling 102 shown in FIG. 2 comprises a number of separate regions including inlet inner barrel 302, fan containment 304, front frame 306, forward bypass 308 and aft bypass 310. The regions making up the nacelle cowling 102 are not shown to scale in FIG. 3, and it is to be understood that some turbofan systems and components may have been omitted for simplification. The engine fan assembly 104 of FIG. 1, including fan rotor hub 110 and a plurality of fan blades 108 (only one of which is shown, blade 312 in FIG. 3), is positioned for rotation such that the tips of fan blades 108 are accommodated within a fan containment structure 314 that is positioned circumferentially around fan rotor hub 110 to protect the aircraft from damage by the fan blades 108.

In the exemplary embodiment, a load housing defines the outer flowpath ducting in the turbofan engine. The load housing comprises primary composite load path 316, which extends from substantially the inlet inner barrel 302 at flange 318 (at the forward or inlet side) to the aft bypass 310, at flange 320 (at the aft side). The primary composite load path 316 provides structural support for distributing weight and inertial loads induced by aircraft flight maneuvers when coupled to weight bearing struts in a front frame assembly (see, FIGS. 7 and 8). A plurality of openings 322 are distributed radially around the primary composite load path and a mount pad 324 is aligned with each opening 322. Coupling the mount pad 324 to the load housing may be accomplished by various means, for example, screws, bolts, fasteners, and the like, and may also employ compliant/elastomeric materials. In the exemplary embodiment, the primary composite load path 316 is continuous from flange 318 to flange 320.

A secondary composite load path 326 extends from a forward side 328 of the fan containment structure 314 to flange 330 at mount pad 324, and extends from flange 332 at the aft side of mount pad 324 to flange 334. The secondary composite load path 326 is coupled to the primary composite load path 316, and is coupled to mount pad 324. In the exemplary embodiment, the secondary composite load path is continuous from forward side 328 to flange 334; having openings to receive mount pads such as mount pad 324. Flanges 330, 332 and 334 are typically circumferentially continuous around the load housing.

In another embodiment with a shorter load housing, the primary composite load path 316 extends from the inlet inner barrel at flange 318 to the aft side of the openings, such as opening 322, typically at flange 332, where it may be coupled to the mount pad 324. In this embodiment, segment 350 of the primary composite load path 316 (extending from the flange 332 to flange 320) is omitted, as is the associated secondary composite load path in this region. This alternative embodiment may offer simplified engine assembly and maintenance options in regard to access to the engine core in the region of segment 350, and may increase overall engine weight by requiring additional assembly features such as flanges, piloting features, alignment pins, fasteners and the like.

An exemplary fairing 336, disposed between primary composite load path 316 and a hub centered on the engine centerline 300, is aerodynamically configured to direct air through the outer flowpath 338 while also providing an internal hollow cavity allowing the pass-through of a load-bearing metallic strut 340. An associated inner flowpath is defined by the hub. Fairings are comprised of a lightweight composite material, and are not load-bearing. The transfer of mechanical loads between the engine core and the airframe is accomplished via load-bearing metallic struts. In FIG. 3, a load-bearing strut 340 is shown extending from substantially the engine centerline 300 through fairing 336 and through mount pad 324, however, as is described in more detail in connection with FIG. 7, load-bearing metallic struts extend radially from a metallic core (see, for example, hub 500 in FIG. 5) that surrounds the engine shaft or centerline and the inner flowpath. Load-bearing strut 340 is shown coupled via a fastener 344 to the mount pad 324. The fairing 336 and load-bearing strut 340 are components of an exemplary embodiment of a circular front frame assembly that is described in more detail in connection with FIGS. 4, 5, 6 and 7.

FIG. 4 is a three dimensional view of a fairing structure 400 in accordance with the exemplary embodiment. Fairing structure 400 is comprised of a plurality of aerodynamically configured composite fairings 402 (see also FIG. 3 336) extending radially from a hub 404. In the exemplary embodiment, each fairing is hollow, and the fairing structure 400 is oriented such that each fairing is aligned with an opening 406 in the hub 404. The shape, orientation and number of fairings are determined by aerodynamic considerations, in order to direct airflow through the outer flowpath 338, defined in part by an inner surface of the load housing (see, primary composite load path 316 of FIG. 3). Advantageously, the composite fairing material and shape may be aerodynamically determined, because the fairings themselves do not have weight bearing duties in the exemplary embodiment. As previously mentioned, load-bearing metallic struts are used for transfer of mechanical loads (load-bearing) and may be inserted through the hollow of each fairing. Decoupling the fairing/aerodynamic duties from the struts/weight bearing duties as provided by the exemplary embodiment enables efficient weight and cost improvement in the turbofan engine outer flowpath ducting and front frame system. The exemplary embodiment optimizes cost and safety because having a simpler load-bearing composite outer flowpath/primary load path that is not integrated with the fairings and hub is much easier to accomplish and reduces manufacturing/inspection details. Relying on simple structural features as described in this embodiment is also easier than relying on the traditional metallic casting that is more prone to defects.

FIG. 5 is a three dimensional view of a metallic hub 500, configured to be coupled to the fairing structure of FIG. 4, in accordance with the exemplary embodiment. Metallic hub 500 is configured to couple around an engine shaft along the engine centerline 300, and the composite fairing hub 404 is configured to couple circumferentially around metallic hub 500. Metallic hub 500 has a plurality of radially aligned openings 502. In the exemplary embodiment, the aft side 504 of metallic hub 500 has a wider opening than the forward side 506, in order to accommodate an associated increase in the size of the engine core in this region.

FIG. 6 is a three dimensional view showing composite fairing structure 400 coupled to metallic hub 500 in accordance with an exemplary embodiment. In the exemplary embodiment, there is a one to one correspondence between the number of openings 502 and the number of fairings 402, and each hollow fairing 402 is aligned with an opening 502 in the metallic hub 500. Likewise, the number of fairings, the number of load-bearing metallic struts, the number of openings in the load housing, and the number of mount pads are equal. For simplifying purposes, the number of these components is referred to as the first number.

Although not shown, mount pads may have additional features for mounting to the aircraft beyond the described features that couple the engine core to the load housing. Notably, all of the mount pad features, in combination with the fastening heads on the ends of each the load-bearing metallic struts may be attachments for mounting to the aircraft regardless of a left hand, a right hand, or a center engine installed empennage-mounted propulsion system. Likewise, the provided system and method are operable for under or over wing attachment engine installation.

Figure 7:
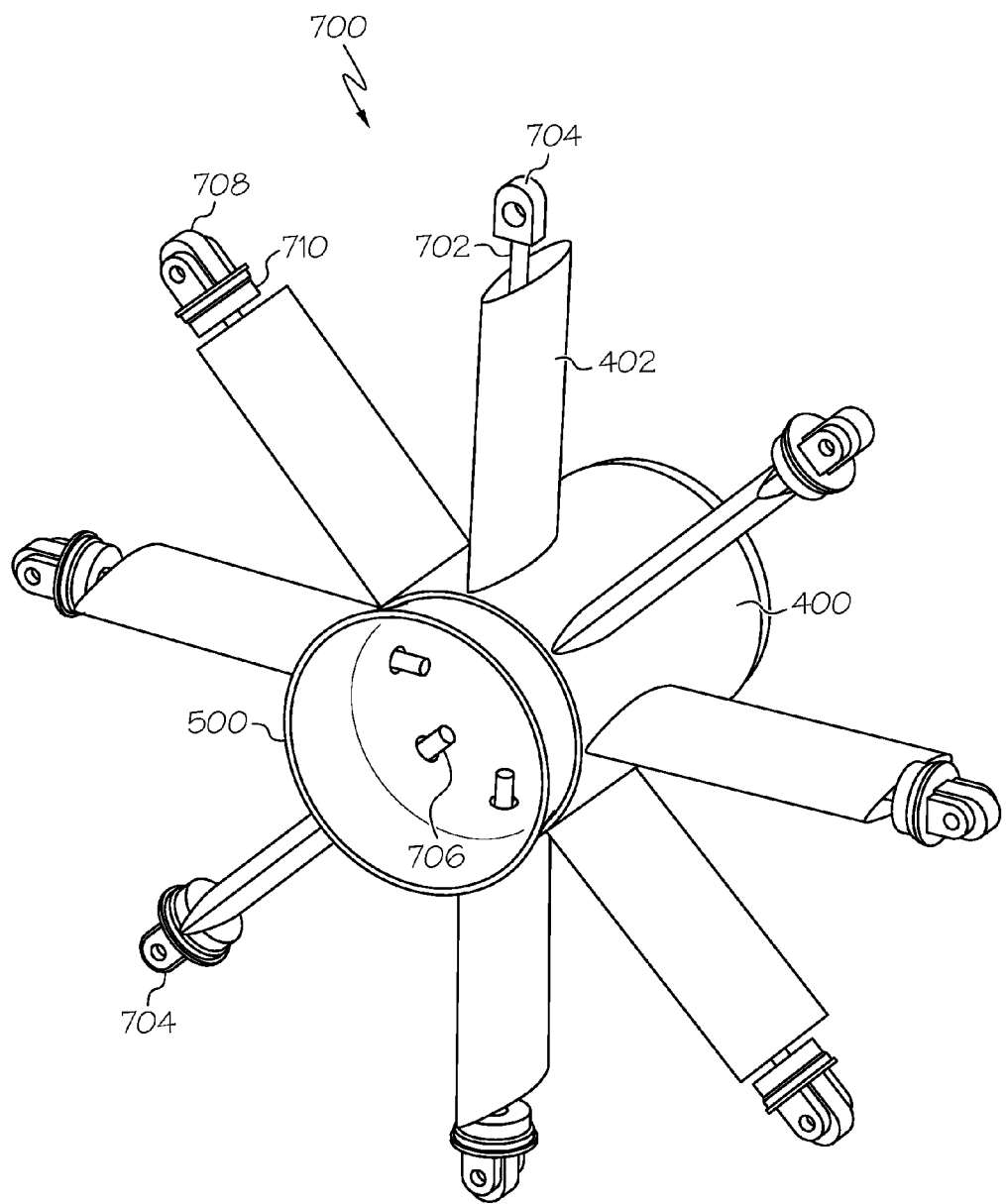
FIG. 7 is a three dimensional view of a front frame assembly in accordance with the exemplary embodiment.

FIG. 7 is a three dimensional view of a front frame assembly 700, in accordance with the exemplary embodiment. The composite fairing structure 400 is shown coupled to metallic hub 500. Fairings 402 are shown with load-bearing metallic struts 702 (see also FIG. 3 340) extending radially from a first end 706 that is radially inward from a second end 704. Second end 704 is shown having a fastening head 708, configured to couple to a mount pad 710. As with the coupling of other components, coupling the fairings 402 and mount pads 710 may be accomplished by various means, for example, screws, bolts, fasteners, and the like, and may also employ compliant/elastomeric materials. The mount pad 710 is described in more detail in connection with FIG. 8.

Figure 8:
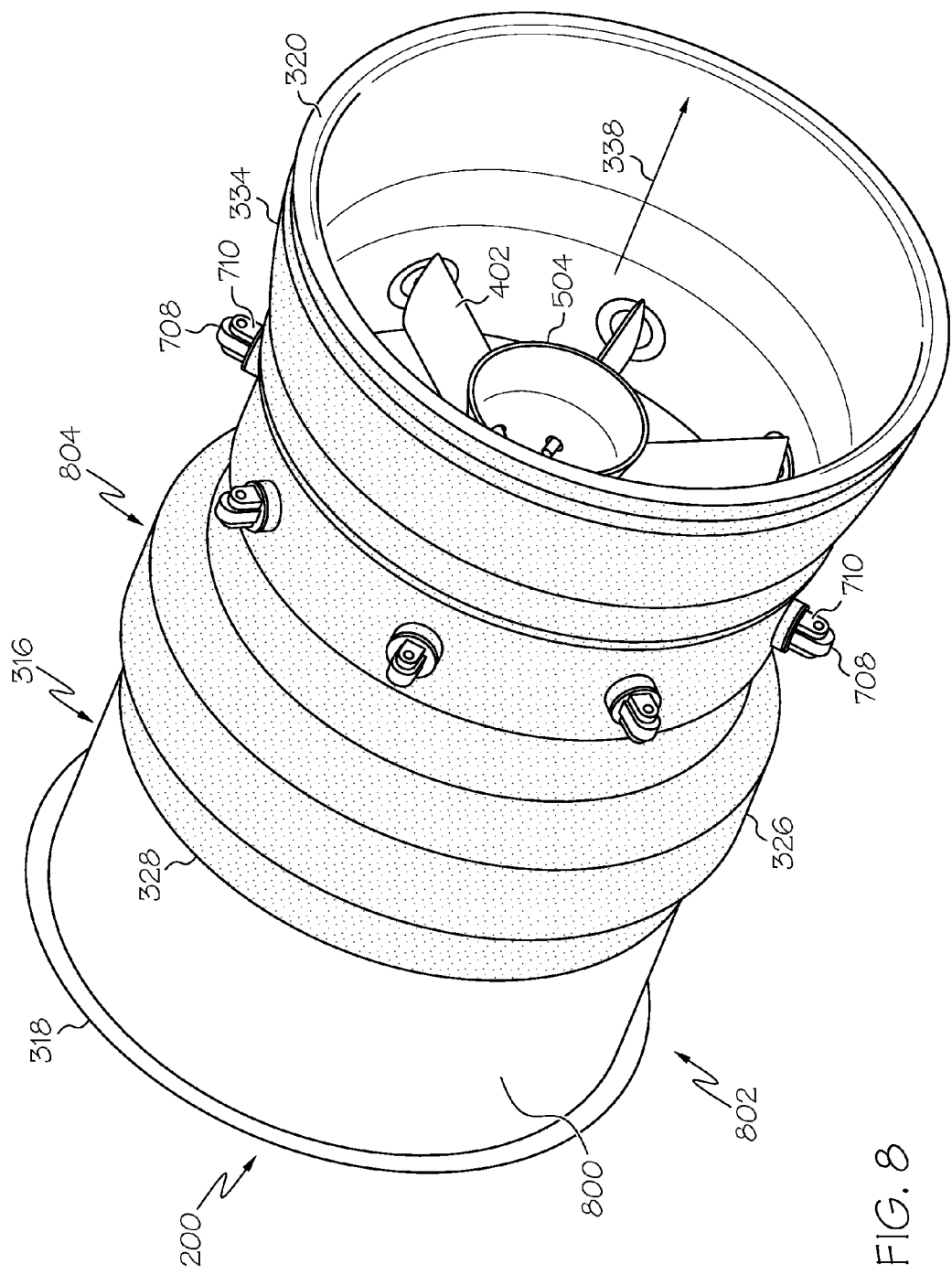
FIG. 8 is a three dimensional view showing a load housing coupled to the components comprising the circular front frame assembly in accordance with the exemplary embodiment.

FIG. 8 is a three dimensional view showing the load housing 800 coupled to the components comprising the circular front frame assembly 700 of FIG. 7, according to the exemplary embodiment. As previously described, the load housing 800 comprises the primary composite load path 316 and the secondary composite load path 326. A fan assembly 104 is occluded from this view, but is positioned inside the load housing near the fan containment structure 804.

As described in connection with FIG. 3, when the exemplary integrated aircraft turbofan engine outer flowpath ducting and front frame system is employed in an aircraft turbofan engine system, the primary composite load path extends from flange 318 located at substantially the inlet end 200 to flange 320, located substantially at the aft bypass 310. In contrast, secondary composite load path 326 extends from forward side 328 to flange 334. Airflow follows outer flowpath 338, as directed by the fairings 402, disposed around metallic hub 504. Fastening heads 708 of load-bearing metallic struts are visible. Mount pads 710 are shown bisecting the primary and secondary composite load paths. It is readily apparent that fastening heads 708 of metal struts 702 are oriented for coupling the circular front frame assembly to the composite load housing.

When the load housing is securely coupled via the mount pads 710 to the front frame assembly 700, the weight bearing metal struts 702 transfer mechanical loads between the metallic hub and the load housing, and the exemplary embodiment provides an integrated outer flowpath ducting and front frame system for a turbofan engine that minimizes assembly interfaces and optimizes weight.

Thus, there has been provided a system and method for an integrated aircraft turbofan engine outer flowpath ducting and front frame system and method that minimizes assembly interfaces and reduces overall aircraft engine weight. The exemplary embodiment provides an integrated turbofan engine outer flowpath ducting and front frame system that decouples the fairing/aerodynamic duties from the struts/ weight bearing duties thereby enabling efficient distribution of mechanical load.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An outer flowpath ducting and front frame system in a turbofan engine, the engine outer flowpath ducting and front frame system comprising:
   a load housing comprising a primary composite load path circumferentially surrounding an engine centerline and defining the outer flowpath; and
   a front frame assembly detachably coupled to the load housing and centered within the load housing, the front frame assembly configured to i) direct air through the outer flowpath, and ii) bear weight,
   the front frame assembly comprising (a) a circular metallic hub centered within the load housing, and (b) a circular composite fairing structure coupled to the metallic hub, comprising a first number of aerodynamically configured fairings extending radially from the metallic hub to the load housing,
   wherein each fairing in the composite fairing structure further comprises a load-bearing metallic strut, comprising:
   i) a first side coupled to the metallic hub; and
   ii) a second side extending into the load housing.

2. The outer flowpath ducting and front frame system of claim 1, wherein each fairing in the compisite fairing structure is substantially hollow and the associated load-bearing metallic strut is positioned within the hollow of the fairing.

3. The outer flowpath ducting and front frame system of claim 1, wherein the second end of each load-bearing metallic strut comprises a fastening head.

4. The outer flowpath ducting and front frame system of claim 1, wherein the load housing further comprises:
   a first number of openings, each opening oriented to receive a housing side of a strut; and
   a first number of mount pads coupled to the primary composite load housing, each mount pad oriented around one of the number of openings and configured to couple an associated housing side of a strut to the primary composite load housing.

5. The outer flowpath ducting and front frame system of claim 1, wherein the turbofan engine comprises an inlet inner barrel region and an aft bypass region, and wherein the primary composite load path is continuous from substantially the inlet inner barrel to the aft bypass region.

6. The outer flowpath ducting and front frame system of claim 5, wherein the turbofan engine comprises a fan containment structure, and further comprising a secondary composite load path extending substantially from a forward side of the fan containment structure to the aft bypass region, the secondary composite load path coupled to the primary composite load path.

7. The outer flowpath ducting and front frame system of claim 6, wherein the secondary composite load path is discontinuous and comprises: a first segment extending substantially from a forward side of the fan containment structure to a forward side of a mount pad; and a second segment extending substantially from an aft side of the mount pad to the aft bypass region.

8. The outer flowpath ducting and front frame system of claim 1, wherein the turbofan engine comprises an inlet inner barrel region and wherein the primary composite load path is continuous from substantially the inlet inner barrel to a forward side of the front frame assembly.

9. An outer flowpath ducting and front frame system in a turbofan engine, the engine outer flowpath ducting and front frame system comprising:
   a primary composite load path circumferentially surrounding an engine centerline and defining the outer flowpath; and
   a front frame assembly centered within the primary composite load path, comprising:
   i) a metallic hub;
   ii) a first number of aerodynamically configured fairings coupled to the metallic hub and extending radially to the primary composite load path; and
   iii) the first number of load-bearing metal struts, each load-bearing strut coupled on a first end to the metallic hub and coupled on the second end to the primary composite load path.

10. The outer flowpath ducting and front frame system of claim 9, wherein the turbofan engine comprises an inlet inner barrel region and an aft bypass region, and wherein the primary composite load path is continuous from substantially the inlet inner barrel to the aft bypass region.

11. The outer flowpath ducting and front frame system of claim 9, wherein each fairing in the front frame assembly is substantially hollow and one load-bearing metallic strut is positioned within the hollow of the fairing.

12. The outer flowpath ducting and front frame system of claim 11, wherein the second side of each strut comprises a fastening head.

13. The outer flowpath ducting and front frame system of claim 11, wherein the load housing further comprises:
   a first number of openings, each opening oriented to receive a second side of a strut; and
   a first number of mount pads coupled to the primary composite load path, each mount pad oriented around one of the openings and configured to couple an associated strut to the primary composite load path.

14. The outer flowpath ducting and front frame system of claim 9, wherein the turbofan engine comprises a fan containment structure, and further comprising:
   a secondary composite load path extending substantially from a forward side of the fan containment structure to the aft bypass region, the secondary composite load path coupled to the primary composite load path.

15. The outer flowpath ducting and front frame system of claim 14, wherein the secondary composite load path is discontinuous and comprises:
   a first segment extending substantially from a forward side of the fan containment structure to a forward side of a mount pad; and a second segment extending substantially from an aft side of the mount pad to the aft bypass region.

16. A method for reducing turbofan engine weight in a turbofan engine having outer flowpath ducting, the method comprising:
- defining the outer flowpath circumferentially around the engine centerline with a continuous primary composite load path;
- directing airflow through the outer flowpath with a plurality of aerodynamically determined composite fairings;
- positioning a plurality of load-bearing metal struts between the primary composite load path and a centered hub;
- coupling the load-bearing metal struts to the primary composite load path.

17. The method of claim 16, wherein the turbofan engine comprises an inlet inner barrel region and an aft bypass region, further comprising extending the primary composite load path continuously from substantially the inlet inner barrel to the aft bypass region.

18. The method of claim 16, further comprising:
- bisecting the primary composite load path with a first number of openings, each opening oriented to receive a metal strut; and
- coupling the load-bearing metal struts to mount pads that are coupled to the primary composite load path.

* * * * *